United States Patent Office 3,078,259
Patented Feb. 19, 1963

3,078,259

VINYLBENZYLSULFONIUM MONOMERS AND POLYMERS

Melvin J. Hatch and Elmer L. McMaster, Midland, Mich., assignors to The Dow Chemical Company, Midland, Mich., a corporation of Delaware No Drawing. Filed Oct. 2, 1959, Ser. No. 843,945
37 Claims. (Cl. 260—79.7)

This invention relates to monomeric and polymeric vinyl sulfonium compounds and to a method for their preparation. It more particularly relates to water soluble vinylbenzyl sulfonium monomers represented by the general Formula I, and to water-soluble polymers, corresponding to the general Formula II, prepared from these monomers and pertains to a method of making the same.

I)

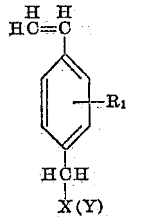

(II)

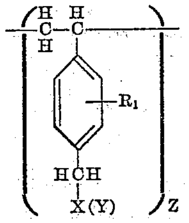

In the Formulae I and II, $R_1$ is selected from the group consisting of hydrogen and alkyl radicals containing from 1 to 6 carbon atoms, X is an organic sulfur-containing compound selected from the group consisting of (A) sulfides of the formula, $R_2SR_3$, wherein $R_2$ and $R_3$ each represents a member of the group consisting of (1) alkyl radicals containing from 1 to 6 carbon atoms, (2) haloalkyl radicals containing from 1 to 6 carbon atoms, (3) hydroxyalkyl radicals containing from 1 to 6 carbon atoms, (4) aralkyl radicals containing from 7 to 12 carbons, (5) $-(CH_2CH_2O)_mCH_2CH_2OH$ wherein *m* is an integer from 1 to 5, (6) $-C_nH_{2n}COOH$, (7) $-C_nH_{2n}COOC_nH_{2n}+1$, (8) $-C_nH_{2n}COO$ alkali metal, (9) $-C_nH_{2n}CONH_2$,

(10) $$-C_nH_{2n}\overset{\overset{O}{\|}}{C}C_nH_{2n+1}$$

(11) $-C_nH_{2n}COC_nH_{2n}+1$ and (12) $-C_nH_{2n}CN$, wherein *n* in substituents (6), (7), (8), (9), (10), (11) and (12) is an integer from 1 to 5 with the total number of carbon atoms in each of the substituents (6), (7), (8), (9), (10), (11) and (12) not exceeding 6, and where the total number of carbon atoms of the $R_2$ and $R_3$ groups attached to a common sulfur atom does not exceed 18 and (B) cyclic thio compounds selected from the group consisting of tetrahydrothiophene, hydroxy substituted tetrahydrothiophene, halo substituted tetrahydrothiophene, alkyl substituted tetrahydrothiophene where alkyl refers to groups containing from 1 to 5 carbon atoms, thiacyclohexane, and 1-oxa, 4-thiacyclohexane; and Y is an anion such as carbonate, chloride, nitrate, acetate, sulfate, bromide, iodide and the like; Z is an integer greater than 10.

The monomeric compounds exemplified by Formula I are useful as intermediates for preparation of the homopolymers or copolymers of two or more vinylbenzyl sulfonium monomers as exemplified by Formula II. The polymeric compounds are useful as water soluble cationic thickening agents, and for the flocculation of slimes. To illustrate, a taconite slime which had a solids settling rate of less than 1 inch per minute, when loaded with a solution of poly [vinylbenzyl (dimethyl) sulfonium] chloride equivalent to about 0.01 pound of polymer per ton of solids in the slimes showed a solids settling rate of approximately 5.0 inches per minute. Increasing the polymer concentration to a loading equivalent of about 0.02 pound per ton of solids in the slimes increased the solids settling rate to about 6.3 inches per minute. Other polymers corresponding to Formula II are similarly useful. These polymers also can be used to promote gel formation of aqueous media.

The monomers of this invention are made by contacting a vinylbenzyl halide with an organic sulfur containing compound in the presence or absence of a solvent or non-solvent liquid medium. The polymers are produced by subjecting the monomers to the polymerization methods conventionally used with free radical catalyzed aqueous systems, i.e., mass-, emulsion-, and solution polymerization in the presence of actinic light, ultra-violet irradiation, gamma radiation, and peroxides.

In preparing the monomers of this invention, a vinylbenzyl halide such as the chloride, bromide, or iodide is reacted with an organic sulfur-containing compound as defined heretofore. Theoretical molar equivalents of the vinylbenzyl halide and the sulfur-containing compound ordinarily are used, although from 50 percent up to 200 percent stoichiometric amounts of the organic sulfur-containing compounds can be used. An excess of about 200 percent of the stoichiometric value in some cases promotes the formation of the vinylbenzyl sulfonium halide monomer. This excess of the sulfur containing reactant is recoverable from the reaction mixture. If the reactants are liquid, preparation of the monomer can be carried out without use of a solvent, but solvents such as water, nitromethane, methanol, ethanol, acetonitrile and the like can be used. The reaction can be carried out at temperatures from about room temperature up to about 100° C.; but reaction temperatures from about 30 to about 80° C. are preferred. The reaction normally will be carried out at substantially atmospheric pressures, but super-atmospheric pressure sufficient to prevent loss of volatile reactants can be employed. A minimum reaction time of about 2 to about 4 hours results in formation of certain of the monomeric sulfonium compounds. However, this reaction time will vary with the different molecular species and reaction times of 24 hours or more can be employed.

The vinylbenzyl sulfonium monomers, as produced, will have a halide anion. If desired this halide form of the monomer can be converted in a conventional manner to any one of a number of common anionic forms such as carbonate, nitrate, sulfate, acetate and the like by passing a solution of the monomer into contact with an anion exchange resin in the proper salt form.

The concentration of monomer in the reaction solution is found by analyzing the solution for total chloride and acid hydrogen ion equivalents. The excess of chloride over hydrogen ion present is attributable to the vinylbenzyl sulfonium chloride, the amount of hydrogen ion indicating the amount of solvolysis of reactants and products and subsequent formation of hydrogen chloride.

The monomer can be separated from the reaction mixture by converting it into an insoluble or slightly soluble salt of the compound, e.g. the perchlorate or the bismuth chloride adduct.

Preparation of the polymers is conveniently carried out by placing a solution containing the monomeric sulfonium compound in a glass bomb and subjecting this material to ultra-violet irradiation for a period of time ranging from 4 hours to two weeks or more. Alternatively, other conventional means of polymerization can be employed as by the use of other vinyl polymerization catalysts, e.g., gamma radiation, "azo" catalysts, peroxides, and the like. The polymers are soluble in aqueous media, but are insoluble in organic solvents such as acetone, absolute alcohols, aliphatic hydrocarbons, ethylene dichloride and the like. The reaction solutions of the polymers with or without dilution are used directly to flocculate slimes.

While the polymers usually contain at least 10 repeated monomeric units (as exemplified in Formula II by the letter Z which must be greater than 10), usually the polymers will have a substantially higher value for Z. The upper limit for Z is dependent on those polymerization media that can be provided which will retain the polymer and monomer in a state whereby further polymerization can be accomplished.

The following examples will serve to further illustrate the invention.

*Example 1.—Preparation of Vinylbenzyl(Dimethyl) Sulfonium Chloride Monomer*

Dimethylsulfide (75 ml.), vinylbenzyl chloride (100 ml., 97.5 percent pure) and 125 ml. water were mixed in a 500 milliliter flask and stirred at room temperature (about 20–25° C.) for about 10 hours. After this time the stirring was stopped, and the two layers which formed were separated. The weight of the aqueous layer was 106 grams. This solution upon analysis was found to be 0.5 normal in chloride and 0.05 normal in hydrogen ion which corresponded to 0.45 mole vinylbenzyl(dimethyl) sulfonium chloride.

The monomer was precipitated as the perchlorate salt from 50 grams of the monomer solution by adding an aqueous mixture of 75 milliliters of saturated potassium perchlorate solution and 75 milliliters of water to the aqueous solution of the monomer. The white crystals of the sulfonium perchlorate were removed from the reaction solution by filtration, washed with water, partially dried in air and then dried to constant weight at about 2 mm. Hg absolute pressure at room temperature over phosphorus pentoxide. Analysis of the product by titration with bromine solution showed that it consisted of monomeric vinylbenzyl(dimethyl)sulfonium perchlorate of 99.7 percent purity.

*Example 2.—Preparation of Vinylbenzyl(Dimethyl) Sulfonium Chloride Monomer in Non-Aqueous Medium*

A charge of 30.4 g. (0.20 mole) of vinylbenzyl chloride, 11.6 g. (0.20 mole) of dimethyl sulfide and 50 ml. of absolute ethanol were mixed and allowed to stand for about 18 hours at room temperature. The reaction solution then was diluted to about 100 ml. total volume with additional absolute ethanol. Ten ml. of this monomer containing solution were mixed with 150 ml. of a filtered solution of bismuth chloride in absolute ethanol. The monomer precipitated therefrom as a dense, white gummy precipitate of the bismuth chloride adduct which rapidly became crystalline. This adduct was recrystallized from 100 ml. of boiling methanol and was found to be essentially insoluble in hot aqueous acetic acid or absolute ethanol.

The recrystallized product was dried over phosphorus pentoxide at less than 2 mm. Hg absolute pressure at room temperature and analyzed for constituent elements. Results of these analyses are as follows:

| | Calculated for theoretical 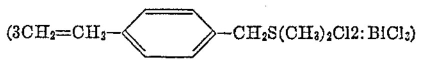 | Analysis (actual) |
|---|---|---|
| | Percent | Percent |
| C | 31.1 | 31.16 |
| H | 3.6 | 3.43 |
| S | 7.5 | 7.80 |
| Cl | 25.0 | 24.1 |

*Example 3.—Preparation of Vinylbenzyl(2-Hydroxyethyl, Ethylbenzyl)Sulfonium Chloride*

A charge of 52 g. of ethylbenzyl(2-hydroxyethyl) sulfide, 37 ml. of vinylbenzyl chloride and 28.7 ml. of distilled water were stirred together at about 40° C. for about 24 hours. The reaction mixture was extracted with 200 ml. of perchloroethylene followed by two extractions with 25 ml. portions of methylene chloride and the resulting 22 ml. aqueous portion separated. The aqueous solution of vinylbenzyl(2-hydroxyethyl, ethylbenzyl)sulfonium chloride was found upon analysis to contain 0.57 milliequivalent of chloride ion and 0.44 milliequivalent of hydrogen ion per milliliter of solution. There was present 0.13 milliequivalent of vinylbenzyl(2-hydroxyethyl, ethylbenzyl)sulfonium chloride per milliliter of solution, which indicates about 5 percent of the reactants had been converted to the vinylbenzyl (2-hydroxyethyl, ethylbenzyl)sulfonium chloride.

*Example 4.—Preparation of Poly[Vinylbenzyl(2-Hydroxyethyl 2-Carbamylethyl)Sulfonium Chloride]*

Twenty-three grams (0.151 mole) of vinylbenzyl chloride, 23 g. (0.154 mole) of 2-hydroxyethyl (2-carbamylethyl)sulfide, and 50 ml. of water were stirred together at about 35–40° C. for about 48 hours. The reaction solution was extracted four times with diethyl ether, and after the final extraction, nitrogen was blown through the residual aqueous solution to strip entrapped ether therefrom. Analysis of this product reaction solution showed chloride ion of 1.4 milliequivalents and hydrogen ion of 0.123 milliequivalent per milliliter of solution. A 30 ml. sample of the aqueous solution was sealed in a pyrex tube and then exposed to ultra-violet irradiation for four hours. The viscous solution resulting from this polymerization treatment was stirred into acetone in which medium the polymeric solution was insoluble and the poly[vinylbenzyl (2-hydrovyethyl, 2-carbamylethyl)sulfonium chloride] was transformed into a gummy solid. This solid was separated from the acetone and placed in water whereupon it redissolved. The viscosity of a 0.5 percent solution of the polymer in 2 percent sodium chloride was 1.66 centipoise.

*Example 5.—Preparation of Vinylbenzyl(Methyl, Pentaethylene Glycol) Sulfonium Chloride and Homopolymer*

A mixture of 21.4 g. (.141 mole) of vinylbenzyl chloride, 40.7 g. (.158 mole) of $$CH_3S(CH_2CH_2O)_4CH_2CH_2OH$$

and 20 ml. of water were stirred together at 35–40° C. for about 23 hours. Analysis for hydrogen ion (.04 milliequivalent per milliliter solution) and chloride ion (1.7 milliequivalents per milliliter solution) indicated about 93 percent conversion to the vinylbenzyl(methyl, pentaethylene glycol) sulfonium chloride monomer.

The solution was extracted three times with equal volumes of diethyl ether and stored at about 5–10° C. for two days. A viscous solution was obtained. The resulting viscous solution was diluted with about 3 volumes of water. A small amount of insoluble gel was removed from the solution by filtration. The filtered solution was placed in a pyrex tube, sealed and exposed to ultra-violet irradiation for one day. A viscous, polymeric solution was obtained. This solution was removed from the tube, precipitated into acetone, and redissolved in water. The viscosity of a 0.5 percent solution of the poly[vinylbenzyl (methyl, pentaethylene glycol) sulfonium chloride] in 2 percent sodium chloride was 1.34 centipoise measured at 25° C.

*Example 6.—Preparation of Vinylbenzyl Tetrahydrothiophenium Chloride*

A charge of 0.65 g. (7.4 millimoles) of tetrahydrothiophene, 1.0 g. (6.5 millimoles) of vinylbenzyl chloride and 3.0 ml. of water were stirred together in a small stoppered flask at approximately 30° C. for about 48 hours. The resulting mixture was extracted twice with 15 ml.

portions of diethyl ether and the aqueous portion separated. Nitrogen was blown through the aqueous solution to remove residual entrapped ether therefrom. The resulting solution upon analysis for hydrogen and chloride ions was found to contain 0.015 milliequivalent of hydrogen ion and 0.60 milliequivalent of chloride ion per milliliter of solution, indicating a yield of about 65 percent of the vinylbenzyl tetrahydrothiophenium chloride.

Tables I and II which follow recite further examples of vinylbenzyl sulfonium monomers and polymers which are prepared according to the method of this invention. Table I shows the vinyl benzyl sulfonium monomers, and Table II shows the polymers.

TABLE I

*Preparation of Vinylbenzyl Sulfonium Chloride Monomers*

| Reactants | | | | | Monomer production | | |
|---|---|---|---|---|---|---|---|
| Organic sulfide | | Aryl-vinyl-benzyl chloride, millimoles | Water, milliliters | Other solvents and reactants | Reaction time, hrs. | Reaction temp., °C. | Conversion to sulfonium cpd., percent [1] |
| Structure | Millimoles | | | | | | |
| $S(CH_3)_2$ | 3,000 | 2,000 | 350 | | 96 | 18–25 | (2) |
| $S(CH_3)_2$ | 200 | 200 | | 50 ml. anhydrous methanol | 18 | 18–25 | 39 |
| $(HOCH_2CH_2)_2S$ | 2,000 | 2,000 | | 400 ml. anhydrous methanol | 24 | 18–25 | 48 |
| 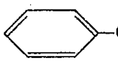$-CH_2SCH_3$ | 65 | 65 | 7 | | 143 | Ca. 30 | 6.7 |
| $HOCH_2CH_2SCH_2COONa$ | 70 | 70 | 100 | | 96 | Ca. 30 | Ca. 91 |
| $H_3CSCH_2COOH$ | 77.5 | 77 | 10 | | 22 | 30–40 | 46 |
| $H_3CSCH_2COOH$ | 113 | 113 | 10 | 113 meq. NaOH | 46 | Ca. 30 | Ca. 100 |
| $H_3CSCH_2COOCH_3$ | 66 | 67 | 2 | 15.6 ml. $CH_3OH$ | 120 | Ca. 40 | 5 |
| $H_3CS(CH_2)_2CH(OH)COONa$ | 93 | 77 | 100 | | 72 | Ca. 40 | 90 |
| $(HOOCCH_2CH_2)_2S$ | 178 | 179 | 100 | | 120 | 40 | 26 |
| $(H_2NOCCH_2CH_2)_2S$ | 55 | 59 | 50 | | 16 | 50 | Ca. 70 |
| $H_3CSCH_2CONH_2$ | 38 | 38 | 25 | | 144 | Ca. 40 | Ca. 72 |
| $-CH_2SCH_2COOH$ | 38.5 | 38 | 10 | 38 millimoles NaOH | 120 | Ca. 40 | Ca. 52 |
| $H_3CSCH_2CH_2OH$ | 230 | 230 | 50 | | 96 | Ca. 40 | 96 |
| $H_3CSCH_2CH_2CONH_2$ | 42 | 42 | 25 | | 27 | Ca. 40 | Ca. 95 |
| $H_3CSCH_2CH(OH)CH_2OH$ | 111 | 222 | 30 | | 24 | Ca. 40 | 87 |

[1] Based on Cl′ and H+ion concentrations in final solution.
[2] Not analyzed-product directly converted to polymer.

TABLE II

*Preparation of Aryl-Vinylbenzyl Sulfonium Chloride Polymers*

| Reactants | | | | | Polymer production | | | Remarks |
|---|---|---|---|---|---|---|---|---|
| Organic sulfide | | Aryl vinyl benzyl chloride, millimoles | Water, milliliters | Other solvents and reactants | Total reaction time | Polymerization catalyst | Result viscosity [1] | |
| Structure | Millimoles | | | | | | | |
| $S(CH_3)_2$ | 3,000 | 2,000 | 350 | | 2 wks. | Bubbled air and actinic light. | 1.9 | Soln. viscous; solid pptd. in acetone, redissolved in $H_2O$. |
| $(HOCH_2CH_2)_2S$ | 484 | 498 | 100 | | 48 hours. | Actinic light and bubbled air. | | Do. |
| $HOCH_2CH_2SCH_2COONa$ | 70 | 70 | 100 | | 168 hrs. | Ultra-violet irradiation-pyrex bomb. | | Do. |
| $H_3CSCH_2COOH$ | 113 | 113 | 10 | 113 meq. NaOH | 166 hrs. | Peroxide | | Do. |
| $H_3CS(CH_2)_2CH(OH)COONa$ | 93 | 77 | 100 | | 118 hrs. | Ultra-violet irradiation-sealed tube. | 2.1 | Do. |
| $(HOOCCH_2CH_2)_2S$ | 178 | 179 | 100 | | 123 hrs. | do | | Do. |
| $(H_2NOCCH_2CH_2)S$ | 55 | 59 | 50 | | 122 hrs. | do | 1.01 | Soln. viscous; sticky and gel pptd. in acetone, dissolved slowly in $H_2O$. |
| $H_3CSCH_2CONH_2$ | 38 | 38 | 25 | | 148 hrs. | do | 2.2 | Soln. viscous; polymer pptd. in acetone, dissolved in water. |
| $H_3CSCH_2CH_2OH$ | 230 | 230 | 50 | | 168 hrs. | Actinic light and peroxides. | 1.02 | Do |
| $H_3CSCH_2CH(OH)CH_2OH$ | 111 | 222 | 30 | | 25 hrs. | Actinic light, stirred in the presence of air. | 1.06 | Do |

[1] 0.5 percent solution in 2 percent aqueous sodium chloride at 25° C.

In a manner similar to that shown for the foregoing Examples,

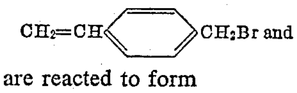 and $CH_3SCH_2CH_2CH_2CH_2COOH$ are reacted to form

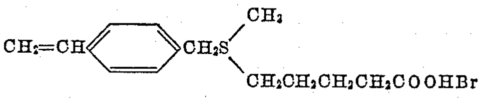

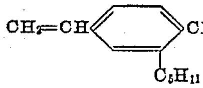 and $C_2H_5SC_5H_{10}OH$ are reacted to form

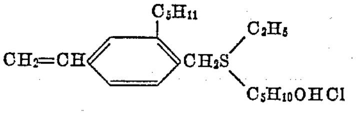

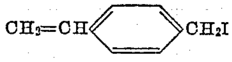 and $C_6H_{11}SCH_2COOK$ are reacted to form

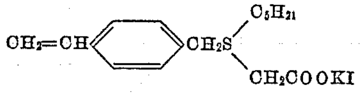

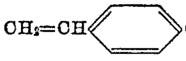 and 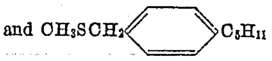

are reacted to form

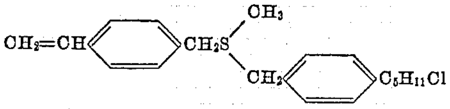

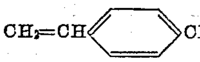 and $CH_3S-C_3H_6COOC_2H$ are reacted to form

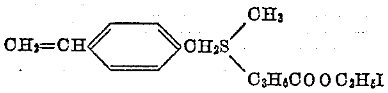

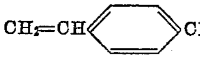 and $CH_3SCH_2CH_2CN$ are reacted to form

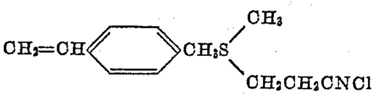

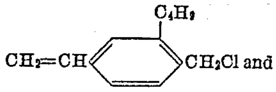 and $C_2H_5S-CH_2CH_2\overset{\overset{O}{\|}}{C}CH_2CH_3$ are reacted to form

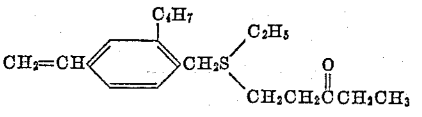

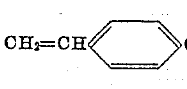 and 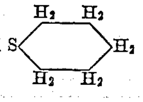

are reacted to form

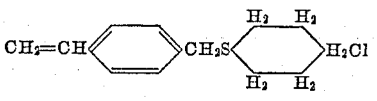

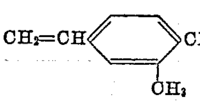 and 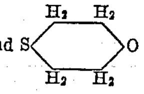

are reacted to form

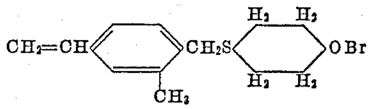

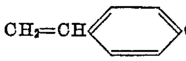 and 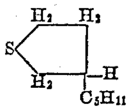

are reacted to form

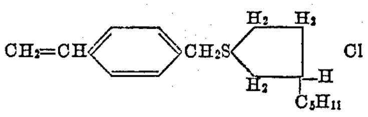

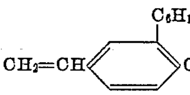 and $CH_3SCH_2Cl$ are reacted to form

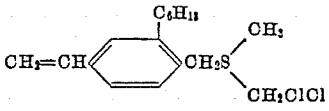

and

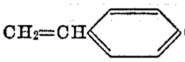 and $CH_3SCH_2(CH_2)_4CH_2Br$ are reacted to form

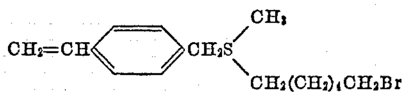

These monomers can be further polymerized to the corresponding poly-[vinyl-benzenesulfonium halides].

Various modifications can be made in the present invention without departing from the spirit or scope thereof for it is understood that we limit ourselves only as defined in the appended claims:

We claim:

1. A water soluble monomeric vinylbenzyl sulfonium compound having the following formula:

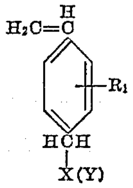

wherein $R_1$ is selected from the group consisting of hydrogen and alkyl containing from 1 to 6 carbon atoms, X is an organic sulfur-containing compound selected from the group consisting of (A) sulfides of the formula, $R_2SR_3$, wherein $R_2$ and $R_3$ each represents a member selected from the group consisting of (1) alkyl radicals containing from 1 to 6 carbon atoms, (2) haloalkyl radicals contaniing from 1 to 6 carbon atoms (3) hydroxyalkyl radicals containing from 1 to 6 carbon atoms, (4) aralkyl radicals containing from 7 to 12 carbon atoms, (5) $-CH_2CH_2O)_mCH_2CH_2OH$ where $m$ is an integer from 1 to 5, (6) $-C_nH_{2n}COOH$, (7) $-C_nH_{2n}COOC_nH_{2n+1}$ (8) $-C_nH_{2n}COO$ alkali metal, (9)$-C_nH_{2n}CONH_2$ (10)

$$-C_nH_{2n}\overset{\overset{O}{\|}}{C}C_nH_{2n+1}$$

(11) $-C_nH_{2n}COC_nH_{2n+1}$ and (12) $-C_nH_{2n}CN$, wherein $n$ in substituents (6), (7), (8), (9), (10), (11) and

(12) is an integer from 1 to 5 with the total number of carbon atoms in each of the substituents (6), (7), (8), (10), (11) and (12) not to exceed 6, and where the total number of carbon atoms of the $R_2$ and $R_3$ groups attached to a common sulfur atom does not exceed 18; (B) a member selected from the group consisting of tetrahydrothiophene, hydroxy substituted tetrahydrothiophene, halo-substituted tetrahydrothiophene, alkyl substituted tetrahydrothiophene where alkyl is limited to those groups containing from 1 to 5 carbons, thiacyclohexane and 1-oxa, 4-thiacyclohexane; and Y is an anion selected from the group consisting of carbonate, chloride, nitrate, acetate, sulfate, bromide and iodide.

2. Vinylbenzyl(dimethyl)sulfonium chloride.

3. Vinylbenzyl(di,2-hydroxyethyl)sulfonium chloride.

4. Vinylbenzyl(2-hydroxyethyl, ethylbenzyl)sulfonium chloride.

5. Vinylbenzyl(benzyl), (methyl) sulfonium chloride.

6. Vinylbenzyl(2-hydroxyethyl, carboxymethyl, sodium salt)sulfonium chloride.

7. Vinylbenzyl(methyl, carboxymethyl) sulfonium chloride.

8. Vinylbenzyl(methyl, carbomethoxy methyl) sulfonium chloride.

9. Vinylbenzyl(methyl, 2-hydroxy, 2-carboxyethyl, sodium salt)sulfonium chloride.

10. Vinylbenzyl(di(2-carboxylethyl) sulfonium chloride.

11. Vinylbenzyl(di - 2-carbamylethyl)sulfonium chloride.

12. Vinylbenzyl(methyl, carbamylmethyl) sulfonium chloride.

13. Vinylbenzyl (benzyl, carboxymethyl) sulfonium chloride.

14. Vinylbenzyl(methyl, 2-carbamylethyl)sulfonium chloride.

15. Vinylbenzyl(2-hydroxyethyl, 2-carbamylethyl)sulfonium chloride.

16. Vinylbenzyl(methyl, 2,3-dihydroxypropyl)sulfonium chloride.

17. Vinylbenzyl(methyl, pentaethyleneglycol)sulfonium chloride.

18. Vinylbenzyl tetrahydrothiophenium chloride.

19. Vinylbenzyl(methyl, 2 - hydroxyethyl)sulfonium chloride.

20. A process for the preparation of water soluble vinylbenzylsulfonium monomers which comprises; contacting a vinylbenzyl halide and an organic sulfur containing compound selected from the group consisting of sulfides and cyclic thio compounds at temperatures from about 18° C. to about 100° C. for a period of time sufficient to prepare the corresponding vinylbenzyl sulfonium halide.

21. A process for the preparation of water soluble vinylbenzyl sulfonium monomers which comprises; contacting a vinylbenzyl halide and an organic sulfur containing compound selected from the group consisting of sulfides and cyclic thio compounds in an aqueous reaction medium at temperatures from about 18° C. to about 80° C. and at substantially atmospheric pressure from about 2 to about 120 hours.

22. A process for the preparation of water soluble vinylbenzyl sulfonium monomers which comprises; contacting a vinylbenzyl halide and an organic sulfur-containing compound selected from the group consisting of sulfides and cyclic thio compounds in a polar anhydrous organic solvent at temperatures from about 18° C. to about 80° C. and at substantially atmospheric pressure from about 2 to about 120 hours.

23. A process for the preparation of water soluble vinylbenzyl sulfonium monomers which comprises, contacting a vinylbenzyl halide with from about 50 percent of stoichiometric to about 200 percent of stoichiometric amounts of an organic sulfur-containing compound selected from the group consisting of sulfides and cyclic thio compounds at temperatures from about 30 to about 40° C. and at substantially atmospheric pressures for a period of time sufficient to prepare the corresponding vinylbenzyl sulfonium halide.

24. A water soluble polymer of at least one vinylbenzyl sulfonium compound which polymer has the following formula:

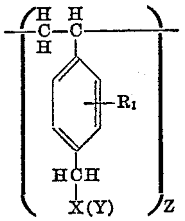

wherein $R_1$ is selected from the group consisting of hydrogen and an alkyl containing from 1 to 6 carbon atoms, X is an organic sulfur-containing compound selected from the group consisting of (A) sulfides of the formula, $R_2SR_3$, wherein $R_2$ and $R_3$ each represents a member of the group consisting of (1) alkyl radicals containing from 1 to 6 carbon atoms, (2) haloalkyl radicals containing from 1 to 6 carbon atoms, (3) hydroxyalkyl radicals containing from 1 to 6 carbon atoms, (4) aralkyl radicals containing from 7 to 12 carbons, (5)

$$-(CH_2CH_2O)_mCH_2CH_2OH$$

wherein *m* is an integer from 1 to 5, (6) $-C_nH_{2n}COOH$, (7) $-C_nH_{2n}COOC_nH_{2n+1}$, (8) $-C_nH_{2n}COO$ alkali metal, (9) $-C_nH_{2n}CONH_2$,

(10) $$-C_nH_{2n}\overset{\overset{O}{\|}}{C}C_nH_{2n+1}$$

(11) $-C_nH_{2n}COC_nH_{2n+1}$ and (12) $-C_nH_{2n}CN$, wherein *n* in substituents (6), (7), (8), (9), (10), (11) and (12) is an integer from 1 to 5 with the total number of carbon atoms in each of the substituents (6), (7), (8), (9), (10), (11) and (12) not to exceed 6, and where the total number of carbon atoms of the $R_2$ and $R_3$ groups attached to a common sulfur atom does not exceed 18, and (B) a member selected from the group consisting of tetrahydrothiophene, hydroxy-substituted tetrahydrothiophene, halo-substituted tetrahydrothiophene, alkyl substituted tetrahydrothiophene where alkyl is limited to those groups containing from 1 to 5 carbons, thiacyclohexane and 1-oxa-4-thiacyclohexane; Y is an anion and Z is an integer greater than 10.

25. Poly-[vinylbenzyl(dimethyl)sulfonium chloride].

26. Poly - [vinylbenzyl(di,2 - hydroxyethanol)sulfonium chloride].

27. Poly-[vinylbenzyl(2-hydroxyethyl, carboxymethyl, sodium salt)sulfonium chloride].

28. Poly-[vinylbenzyl(methyl, carboxymethyl)sulfonium chloride].

29. Poly - [vinylbenzyl(methyl, 2-hydroxy-2-carboxyethyl, sodium salt)sulfonium chloride].

30. Poly - [vinylbenzyl(di,2 - carboxyethyl)sulfonium chloride].

31. Poly - [vinylbenzyl(di,2-carbamylethyl)sulfonium chloride].

32. Poly - [vinylbenzyl(methyl, carbamylmethyl)sulfonium chloride].

33. Poly - [vinylbenzyl(methyl, 2-hydroxyethyl)sulfonium chloride].

34. Poly - [vinylbenzyl(2 - hydroxyethyl, 2-carbamylethyl)sulfonium chloride].

35. Poly - [vinylbenzyl(methyl, 2,3-dihydroxypropyl) sulfonium chloride].

36. Poly - [vinylbenzyl(methyl, polyethylene glycol) sulfonium chloride].

37. A process for the production of water soluble polymers of vinylbenzyl sulfonium water soluble monomers which comprises subjecting said monomers, in aqueous solution, to a vinylpolymerization catalyst for a period of time sufficient to produce water soluble polymers of said vinylbenzyl sulfonium compounds.

References Cited in the file of this patent

UNITED STATES PATENTS

| | | |
|---|---|---|
| 2,178,353 | Werntz | Oct. 31, 1939 |
| 2,193,963 | Harris | Mar. 19, 1940 |
| 2,794,026 | Johnston | May 28, 1957 |
| 2,895,925 | Hwa | July 21, 1959 |

UNITED STATES PATENT OFFICE

CERTIFICATE OF CORRECTION

Patent No. 3,078,259 February 19, 1963

Melvin J. Hatch et al.

It is hereby certified that error appears in the above numbered patent requiring correction and that the said Letters Patent should read as corrected below.

Column 7, lines 25 to 28, the upper right-hand portion of the formula reading

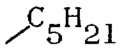 read 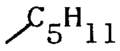

lines 38 and 39, for the extreme right-hand portion of the formula reading $-C_3H_6COOC_2H$ read $-C_3H_6COOC_2H_5$ lines 49 to 51, for that portion of the formula reading

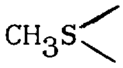 read 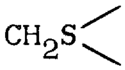

same column, lines 59 to 61, the upper left-hand portion of the formula reading

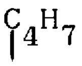 read 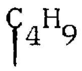

column 8, line 65, after "(5)" the formula should appear as shown below instead of as in the patent:

$$-(CH_2CH_2O)_mCH_2CH_2OH$$

Signed and sealed this 12th day of November 1963.

(SEAL)
Attest:
ERNEST W. SWIDER — Attesting Officer

EDWIN L. REYNOLDS — Acting Commissioner of Patents